United States Patent
Hirose et al.

(10) Patent No.: US 10,061,132 B2
(45) Date of Patent: Aug. 28, 2018

(54) BEAM SCANNING DEVICE, OPTICAL WIRELESS COMMUNICATION SYSTEM, AND BEAM SCANNING METHOD

(71) Applicant: Mitsubishi Electric Corporation, Chiyoda-ku (JP)

(72) Inventors: Fukiko Hirose, Tokyo (JP); Keita Mochizuki, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/566,357

(22) PCT Filed: Aug. 20, 2015

(86) PCT No.: PCT/JP2015/073354
§ 371 (c)(1),
(2) Date: Oct. 13, 2017

(87) PCT Pub. No.: WO2017/029752
PCT Pub. Date: Feb. 23, 2017

(65) Prior Publication Data
US 2018/0113319 A1    Apr. 26, 2018

(51) Int. Cl.
*G02B 27/09*    (2006.01)
*G02B 27/01*    (2006.01)
(Continued)

(52) U.S. Cl.
CPC ....... *G02B 27/0916* (2013.01); *G02B 26/106* (2013.01); *G02B 26/123* (2013.01);
(Continued)

(58) Field of Classification Search
CPC .............. G02B 27/0916; G02B 26/101; G02B 26/106; G02B 26/123; G02B 27/0103;
(Continued)

(56) References Cited

U.S. PATENT DOCUMENTS

| 4,914,662 A | * | 4/1990 | Nakatani | ................. | H01S 3/131 |
| | | | | | 372/29.021 |
| 6,278,538 B1 | * | 8/2001 | Schleipen | ............ | G02B 26/106 |
| | | | | | 235/457 |

(Continued)

FOREIGN PATENT DOCUMENTS

| JP | 9-218305 | 8/1997 |
| JP | 2009-145838 A | 7/2009 |

(Continued)

OTHER PUBLICATIONS

Written Opinion of the International Search Report dated Nov. 2, 2015 in PCT/JP2015/073354 filed Aug. 20, 2015.

(Continued)

*Primary Examiner* — Frank Font
(74) *Attorney, Agent, or Firm* — Oblon, McClelland, Maier & Neustadt, L.L.P.

(57) ABSTRACT

A beam scanning device includes a variable-wavelength laser that emits a laser beam, a plane-wave converting unit that converts the laser beam into a plane-wave laser beam, a light-intensity-distribution converting unit including a first light-intensity-distribution converting unit set to be obliquely tilted with respect to an emitting direction of the laser beam within a horizontal plane and a second light-intensity-distribution converting unit set to be obliquely tilted with respect to the emitting direction of the laser beam within a plane perpendicular to the horizontal plane and parallel to the emitting direction of the laser beam, the light-intensity-distribution converting unit converting a peak position of light intensity of the plane-wave laser beam according to a wavelength of the plane-wave laser beam, and a spherical-wave converting unit that converts the plane-wave laser beam, the peak position of the light intensity of which is converted, into a spherical-wave laser beam.

13 Claims, 12 Drawing Sheets

(51) Int. Cl.
*G02B 26/10* (2006.01)
*G02B 26/12* (2006.01)

(52) U.S. Cl.
CPC ..... *G02B 27/0103* (2013.01); *G02B 27/0927* (2013.01); *G02B 2027/0125* (2013.01)

(58) Field of Classification Search
CPC ............ G02B 27/0927; G02B 27/1006; G02B 2027/0125; H04B 10/116
USPC .... 359/204.1, 298, 299, 320, 356, 583, 629, 359/636, 896; 372/23; 398/130, 140
See application file for complete search history.

(56) References Cited

U.S. PATENT DOCUMENTS

| | | | | |
|---|---|---|---|---|
| 6,665,321 | B1* | 12/2003 | Sochava | H01S 5/141 372/19 |
| 6,937,628 | B2* | 8/2005 | Tatsuno | H01S 5/0687 372/19 |
| 6,965,479 | B2* | 11/2005 | Sano | G02B 6/29349 359/276 |
| 7,697,578 | B2* | 4/2010 | Yamazaki | H01S 5/1071 372/23 |
| 2002/0044575 | A1* | 4/2002 | May | H01S 5/0687 372/20 |
| 2002/0071458 | A1* | 6/2002 | Iwafuji | H04B 10/506 372/23 |
| 2005/0105565 | A1* | 5/2005 | Tobiason | H01S 3/1062 372/20 |
| 2005/0147135 | A1* | 7/2005 | Kurtz | H01S 5/36 372/23 |
| 2012/0147361 | A1 | 6/2012 | Mochizuki et al. | |
| 2014/0285807 | A1 | 9/2014 | Mochizuki et al. | |
| 2015/0222077 | A1* | 8/2015 | Miyata | H01S 5/02415 372/20 |

FOREIGN PATENT DOCUMENTS

| | | |
|---|---|---|
| JP | 2012-129259 A | 7/2012 |
| JP | 2013-243304 A | 12/2013 |
| JP | 2014-209561 A | 11/2014 |
| JP | 2015-225222 A | 12/2015 |

OTHER PUBLICATIONS

International Search Report dated Nov. 2, 2015 in PCT/JP2015/073354 filed Aug. 20, 2015.

* cited by examiner (PLAN VIEW)

(SIDE VIEW)

OBSERVATION PLANE

BEAM SCANNING DEVICE, OPTICAL WIRELESS COMMUNICATION SYSTEM, AND BEAM SCANNING METHOD

FIELD

The present invention relates to a beam scanning device, an optical wireless communication system, and a beam scanning method for scanning a laser beam.

BACKGROUND

There has been a beam scanning device including a variable-wavelength light source and a partially-transmissive etalon (see, for example, Patent Literature 1). The beam scanning device makes a laser beam output from the variable-wavelength light source incident on the partially-transmissive etalon and scans the laser beam to thereby realize the scanning of the laser beam without using mechanical movable components.

CITATION LIST

Patent Literature

Patent Literature 1: Japanese Patent Application Laid-Open No. 2009-145838

SUMMARY

Technical Problem

However, according to the conventional technology described above, secondary diffracted light occurs and light intensity of the laser beam is multimodal light intensity having a plurality of peaks. Because the secondary diffracted light is a noise component, there is a problem in that communication quality is deteriorated when the beam scanning device is used for optical wireless communication. In the optical wireless communication, it is desired to perform scanning with a unimodal laser beam having one peak of light intensity.

The present invention has been devised in view of the above, and an object of the present invention is to obtain a beam scanning device capable of suppressing secondary diffracted light and changing a wavelength and scanning a unimodal laser beam in two-dimensional directions.

Solution to Problem

To solve the problem and achieve the object, a beam scanning device of the present invention includes a variable-wavelength laser capable of changing a wavelength and emitting a laser beam. The beam scanning device includes a plane-wave converting unit to convert the laser beam into a plane-wave laser beam. The beam scanning device includes a light-intensity-distribution converting unit including a first light-intensity-distribution converting unit set to be obliquely tilted with respect to an emitting direction of the laser beam within a horizontal plane and a second light-intensity-distribution converting unit set to be obliquely tilted with respect to the emitting direction of the laser beam within a plane perpendicular to the horizontal plane and parallel to the emitting direction of the laser beam, the light-intensity-distribution converting unit converting a peak position of light intensity of the plane-wave laser beam according to a wavelength of the plane-wave laser beam. The beam scanning device includes a spherical-wave converting unit to convert the plane-wave laser beam, the peak position of the light intensity of which is converted, into a spherical-wave laser beam.

Advantageous Effects of Invention

The beam scanning device according to the present invention achieves an effect that it is possible to suppress secondary diffracted light and change a wavelength to scan a unimodal laser beam in two-dimensional directions.

DESCRIPTION OF EMBODIMENTS

Beam scanning devices, optical wireless communication systems, and beam scanning methods according to embodiments of the present invention are explained in detail below with reference to the drawings. Note that the present invention is not limited by the embodiments.

First Embodiment

Figure 1:
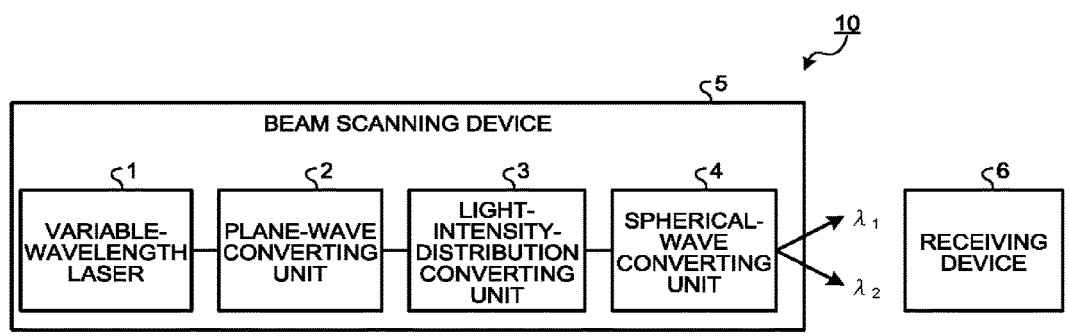
FIG. 1 is a block diagram showing a configuration example of an optical wireless communication system including a beam scanning device according to a first embodiment.

FIG. 1 is block diagram showing a configuration example of an optical wireless communication system 10 including a beam scanning device 5 according to a first embodiment of the present invention. The optical wireless communication system 10 includes the beam scanning device 5 and a receiving device 6. In FIG. 1, a state in shown in which the beam scanning device 5 changes a wavelength of a laser beam to scan the laser beam, whereby the receiving device 6 receives an optical signal of the laser beam emitted from the beam scanning device 5.

The beam scanning device 5 includes a variable-wavelength laser 1, a plane-wave converting unit 2, a light-intensity-distribution converting unit 3, and a spherical-wave converting unit 4. In the beam scanning device 5, when the variable-wavelength laser 1 emits a laser beam, the plane-wave converting unit 2 converts the laser beam into a plane-wave laser beam. As explained below, according to a wavelength, for example, a wavelength $\lambda_1$ or a wavelength $\lambda_2$ of the laser beam emitted from the variable-wavelength laser 1, the light-intensity-distribution converting unit 3 performs light intensity distribution conversion for distributing peaks of light intensity to positions different depending on a wavelength. The light-intensity-distribution converting unit 3 converts the laser beam into a unimodal light intensity distribution according to the light intensity distribution conversion and spatially changes the light intensity distribution according to the wavelength of the laser beam emitted from the variable-wavelength laser 1. The spherical-wave converting unit 4 converts the plane-wave laser beam subjected to the light intensity distribution conversion by the light-intensity-distribution converting unit 3 into a spherical-wave laser beam and changes an emitting direction of the laser beam on the basis of the position of the laser beam made incident from the light-intensity-distribution converting unit 3. The receiving device 6 receives a laser beam emitted from the beam scanning device 5 in the direction of the receiving device 6. The receiving device 6 is a device that receives a laser beam, that is, an optical signal and can be either a moving type or a stationary type. In this way, the beam scanning device 5 can transmit the laser beam to the position of the receiving device 6 by changing the wavelength and scanning the laser beam.

The components of the beam scanning device 5 are explained in detail.

The variable-wavelength laser 1 is a semiconductor laser element such as a DFB (Distributed Feed-Back) laser or a DBR (Distributed Bragg Reflector) laser. The variable-wavelength laser 1 emits a laser beam to the plane-wave converting unit 2 while changing a wavelength. The variable-wavelength laser 1 changes a wavelength to generate a laser beam and emits the generated laser beam such that scanning of the laser beam can be performed in a specified area. The variable-wavelength laser 1 emits a spherical-wave laser beam to the plane-wave converting unit 2. When the semiconductor laser element is used, the variable-wavelength laser 1 can easily change a wavelength of the laser beam by changing the temperature of the semiconductor laser element. As a method of changing the temperature of the semiconductor laser element, there are, for example, a method of disposing the semiconductor laser element on a Peltier element to change the temperature and a method of disposing a resistor such as a thin-film resistor around the semiconductor laser element and feeding an electric current to change the temperature. The variable-wavelength laser 1 can perform carrier injection into the semiconductor laser element and perform a wavelength shift of the laser beam according to a carrier plasma effect. Note that, concerning the variable-wavelength laser 1, a fiber laser or the like can be used.

The plane-wave converting unit 2 is configured by a collimate lens. The plane-wave converting unit 2 adjusts a focal length according to a spot size of a laser beam made incident from the variable-wavelength laser 1 and enlarges a beam diameter of the laser beam made incident from the variable-wavelength laser 1 to a beam diameter desired in the light-intensity-distribution converting unit 3. For example, when the plane-wave converting unit 2 enlarges the beam diameter of the laser beam emitted to the light-intensity-distribution converting unit 3 to 0.5 millimeters, if a wavelength of the laser beam made incident from the variable-wavelength laser 1 is 1550 nanometers, a spread angle of the laser beam is approximately 0.094°. The laser beam having the enlarged beam diameter can be simulatively regarded as a plane wave. In this way, the plane-wave converting unit 2 converts the spherical-wave laser beam made incident from the variable-wavelength laser 1 into the plane-wave laser beam and emits the plane-wave laser beam to the light-intensity-distribution converting unit 3. Note that it is assumed that the plane-wave converting unit 2 converts the laser beam made incident from the variable-wavelength laser 1 into the plane-wave laser beam without changing an emitting direction of the laser beam in the variable-wavelength laser 1.

Figure 2:
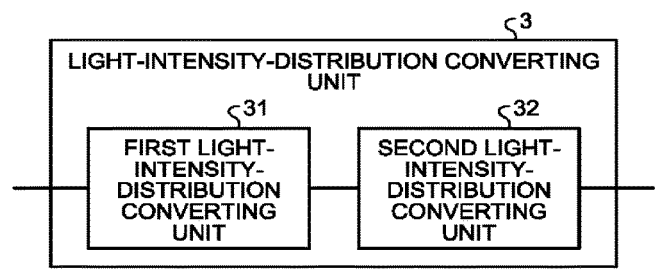
FIG. 2 is a block diagram showing a configuration example of a light-intensity-distribution converting unit of the beam scanning device according to the first embodiment.
Figure 3:
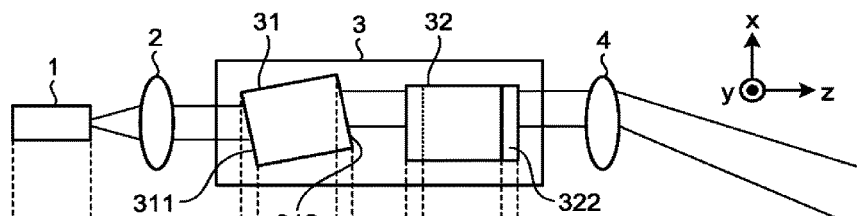
FIG. 3 is a diagram showing an example of disposition of components of the beam scanning device according to the first embodiment.
Figure 3:
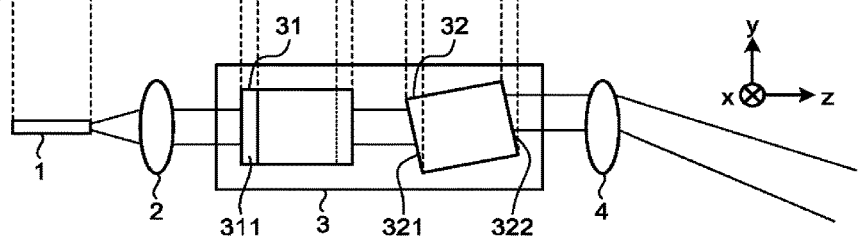

As an example, the light-intensity-distribution converting unit 3 is configured by two light-intensity-distribution converting units. FIG. 2 is a block diagram showing a configuration example of the light-intensity-distribution converting unit 3 of the beam scanning device 5 according to the first embodiment. FIG. 3 is a block diagram showing an example of disposition of the components of the beam scanning device 5 according to the first embodiment. As shown in FIG. 2, the light-intensity-distribution converting unit 3 includes a first light-intensity-distribution converting unit 31 and a second light-intensity-distribution converting unit 32. As shown in the plan view of FIG. 3, the first light-intensity-distribution converting unit 31 is set to be obliquely tilted with respect to an emitting direction of a laser beam emitted from the variable-wavelength laser 1 (a z direction) within a horizontal plane (an xz plane), that is, an emitting direction of a plane-wave laser beam emitted from the plane-wave converting unit 2. Specifically, an angle between the emitting direction of the plane-wave laser beam and a normal direction of an incident surface 311 is an angle larger than 0° and smaller than 90° Consequently, the plane-wave laser beam is made incident on the incident surface 311 while tilting with respect to the normal direction of the incident surface 311 of the first light-intensity-distribution converting unit 31. The incident surface 311 is a first incident surface. As shown in the side view of FIG. 3, the second light-intensity-distribution converting unit 32 is set to be obliquely tilted with respect to an emitting direction of a laser beam emitted from the variable-wavelength laser 1 (the z direction) within a plane perpendicular to the horizontal plane and parallel to the emitting direction of the laser beam emitted from the variable-wavelength laser 1 (an yz plane), that is, an emitting direction of a plane-wave laser beam emitted from the first light-intensity-distribution converting unit 31. Specifically, an angle between the emitting direction of the plane-wave laser beam and a normal direction of an incident surface 321 is an angle larger than 0° and smaller than 90°. Consequently, the plane-wave laser beam is made incident on the incident surface 321 while tilting with respect to the normal direction of the incident surface 321 of the second light-intensity-distribution converting unit 32. The incident surface 321 is a second incident surface. Note that, as shown in FIG. 3, a direction perpendicular to the emitting direction of the laser beam within the horizontal plane is represented as an x direction, the vertical direction is represented as a y direction, and the emitting direction of the laser beam is represented as the z direction.

Figure 4:
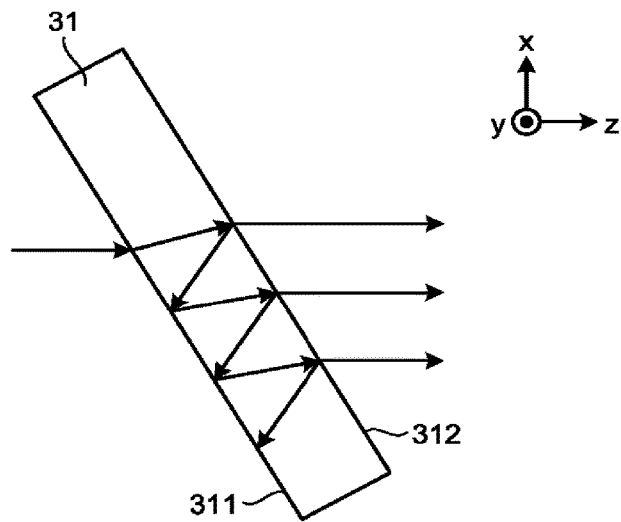
FIG. 4 is a diagram showing a plane-wave laser beam made incident on a first light-intensity-distribution converting unit and a plane-wave laser beam emitted from the first light-intensity-distribution converting unit of the beam scanning device according to the first embodiment.

FIG. 4 is a diagram showing a plane-wave laser beam made incident on the first light-intensity-distribution converting unit 31 and a plane-wave laser beam emitted from the first light-intensity-distribution converting unit 31 of the beam scanning device 5 according to the first embodiment. FIG. 4 shows a state in which an etalon is used as the first light-intensity-distribution converting unit 31 and Fabry-Perot interference is used. An AR (Anti-Reflection) coat is applied to a part of the incident surface 311 of the first light-intensity-distribution converting unit 31 such that the plane-wave laser beam is made incident on the incident surface 311 without reflection. A gold coat is applied to the other part of the incident surface 311 such that the plane-wave laser beam is totally reflected in the inside. On the other hand, a partial reflection coat is applied to an emission surface 312 of the first light-intensity-distribution converting unit 31 such that the plane-wave laser beam is partially reflected. Note that, as shown in FIG. 4, a traveling direction of the plane-wave laser beam made incident from the plane-wave converting unit 2 is represented as the z direction and a direction perpendicular to the paper surface is represented as the y direction. In FIG. 4, as schematically indicated by a solid line arrow, the plane-wave laser beam made incident on the first light-intensity-distribution converting unit 31 is multiply reflected in the inside of the first light-intensity-distribution converting unit 31. A plurality of plane-wave laser beams are emitted from the emission surface 312 of the first light-intensity-distribution converting unit 31. According to control of the variable-wavelength laser 1, the plane-wave converting unit 2, or the variable-wavelength laser 1 and the plane-wave converting unit 2, the beam scanning device 5 changes a beam diameter of a laser beam made incident on the first light-intensity-distribution converting unit 31 to a beam diameter with which adjacent plane-wave laser beams overlap concerning a plurality of plane-wave laser beams multiply reflected inside the first light-intensity-distribution converting unit 31, that is, a beam diameter with which gaps do not occur among a plurality of plane-wave laser beams emitted from the first light-intensity-distribution converting unit 31 to the second light-intensity-distribution converting unit 32. Consequently, the first light-intensity-distribution converting unit 31 can convert the laser beam into a unimodal light intensity distribution and spatially change the light intensity distribution in two-dimensional directions according to a wavelength of the laser beam while suppressing secondary diffracted light. Because adjacent plane-wave laser beams overlap and interfere with each other, the first light-intensity-distribution converting unit 31 converts peak positions of light intensity of the plane-wave laser beams into a unimodal light intensity distribution in which the peak positions are distributed to different positions according to wavelengths of the plane-wave laser beams.

Figure 5:
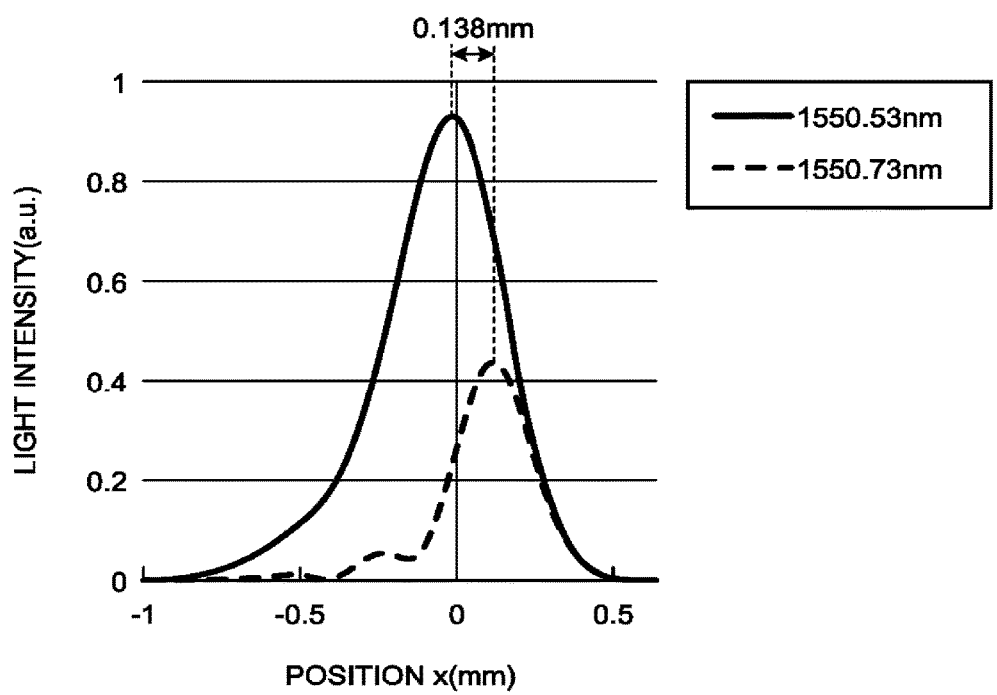
FIG. 5 is a diagram showing a simulation result of a light intensity distribution on an observation plane after transmission through the first light-intensity-distribution converting unit parallel to an xy plane in the beam scanning device according to the first embodiment.

FIG. 5 is a diagram showing a simulation result of a light intensity distribution on an observation plane after transmission through the first light-intensity-distribution converting unit 31 parallel to an xy plane in the beam scanning device 5 according to the first embodiment. In FIG. 5, the vertical axis represents light intensity (in any unit indicated by a. u. (arbitrary. unit.)) and the horizontal axis represents a position (in a millimeter unit) in the x-axis direction shown in FIG. 4. Note that an x coordinate of the position of the center of a beam diameter of a laser beam emitted from the variable-wavelength laser 1 is represented as x=0. As shown in FIG. 5, when light intensity at the time when the wavelength $\lambda_1$ of the laser beam emitted from the variable-wavelength laser 1 is 1550.53 nanometers and light intensity at the time when the wavelength $\lambda_2$ of the laser beam emitted from the variable-wavelength laser 1 is 1550.73 nanometers are compared, it is seen that peak positions of the light intensities are different by 0.138 millimeters after transmission through the first light-intensity-distribution converting unit 31. In this way, the first light-intensity-distribution converting unit 31 can change a light intensity distribution in the horizontal (x-axis) direction according to a wavelength change of the laser beam emitted from the variable-wavelength laser 1. Concerning the laser beam emitted from the first light-intensity-distribution converting unit 31, because the emitted laser beam is close to a plane wave, the laser beam is propagated to the second light-intensity-distribution converting unit 32 while maintaining the light intensity distribution without changing an emission angle.

Figure 6:
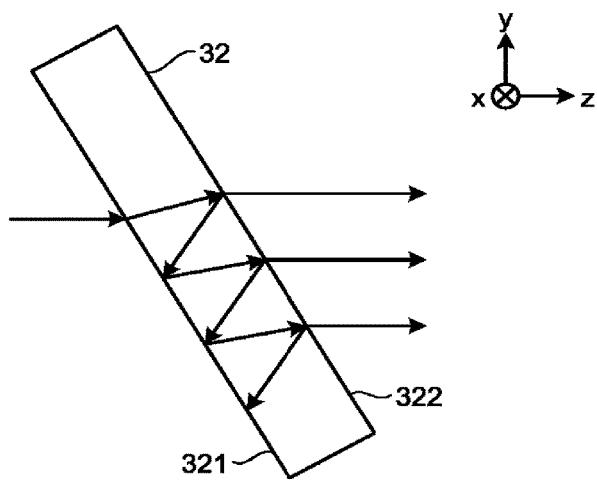
FIG. 6 is a diagram showing a plane-wave laser beam made incident on a second light-intensity-distribution converting unit and a plane-wave laser beam emitted from the second light-intensity-distribution converting unit of the beam scanning device according to the first embodiment.

FIG. 6 is a diagram showing a plane-wave laser beam made incident on the second light-intensity-distribution converting unit 32 and a plane-wave laser beam emitted from the second light-intensity-distribution converting unit 32 of the beam scanning device 5 according to the first embodiment. FIG. 6 shows a state in which an etalon is used as the second light-intensity-distribution converting unit 32 and the Fabry-Perot interference is used. An AR coat is applied to a part of the incident surface 321 of the second light-intensity-distribution converting unit 32 such that the plane-wave laser beam is made incident on the incident surface 321 without reflection. A gold coat is applied to the other part of the incident surface 321 such that the plane-wave laser beam is totally reflected in the inside. On the other hand, a partial reflection coat is applied to an emission surface 322 of the second light-intensity-distribution converting unit 32 such that the plane-wave laser beam is partially reflected. Note that, as shown in FIG. 6, a traveling direction of the plane-wave laser beam made incident from the first light-intensity-distribution converting unit 31 is represented as the z direction and a direction perpendicular to the paper surface is represented as the x direction. In FIG. 6, as schematically indicated by a solid line arrow, the plane-wave laser beam made incident on the second light-intensity-distribution converting unit 32 is multiply reflected in the inside of the second light-intensity-distribution converting unit 32. A plurality of plane-wave laser beams are emitted from the emission surface 322 of the second light-intensity-distribution converting unit 32. According to control of the variable-wavelength laser 1, the plane-wave converting unit 2, or the variable-wavelength laser 1 and the plane-wave converting unit 2, the beam scanning device 5 changes a beam diameter of a laser beam made incident on the second light-intensity-distribution converting unit 32 from the first light-intensity-distribution converting unit 31 to a beam diameter with which adjacent plane-wave laser beams overlap concerning a plurality of plane-wave laser beams multiply reflected inside the second light-intensity-distribution converting unit 32, that is, a beam diameter with which gaps do not occur among a plurality of plane-wave laser beams emitted from the second light-intensity-distribution converting unit 32 to the spherical-wave converting unit 4. Consequently, the second light-intensity-distribution converting unit 32 can convert the laser beam into a unimodal light intensity distribution and spatially change the light intensity distribution in two-dimensional directions according to a wavelength of the laser beam while suppressing secondary diffracted light. Because adjacent plane-wave laser beams overlap and interfere with each other, the second light-intensity-distribution converting unit 32 converts peak positions of light intensity of the plane-wave laser beams into a unimodal light intensity distribution in which the peak positions are distributed to different positions according to wavelengths of the plane-wave laser beams.

Figure 7:
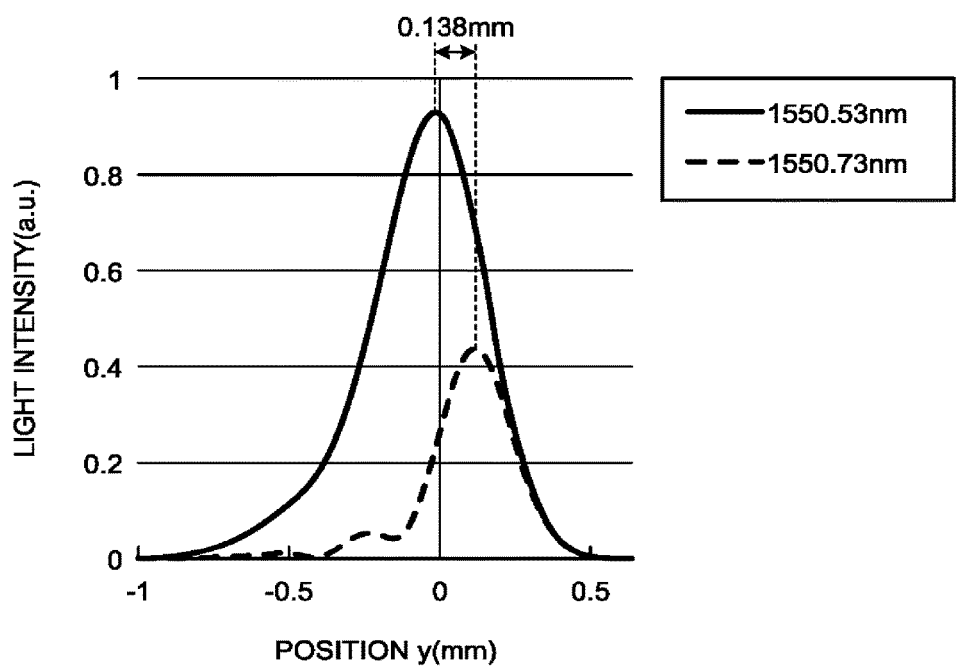
FIG. 7 is a diagram showing a simulation result of a light intensity distribution on the observation plane after transmission through the second light-intensity-distribution converting unit parallel to the xy plane in the beam scanning device according to the first embodiment.

FIG. 7 is a diagram showing a simulation result of a light intensity distribution on the observation plane after transmission through the second light-intensity-distribution converting unit 32 parallel to the xy plane in the beam scanning device 5 according to the first embodiment. In FIG. 7, the vertical axis represents light intensity (in any unit indicated by a. u.) and the horizontal axis represents a position (in a millimeter unit) in the y-axis direction shown in FIG. 6. Note that a y coordinate of the position of the center of a beam diameter of a laser beam emitted from the variable-wavelength laser 1 is represented as y=0. As shown in FIG. 7, when light intensity at the time when the wavelength $\lambda_1$ of the laser beam emitted from the variable-wavelength laser 1 is 1550.53 nanometers and light intensity at the time when the wavelength $\lambda_2$ of the laser beam emitted from the variable-wavelength laser 1 is 1550.73 nanometers are compared, it is seen that peak positions of the light intensities are different by 0.138 millimeters after transmission through the second light-intensity-distribution converting unit 32. In this way, the second light-intensity-distribution converting unit 32 can change a light intensity distribution in the vertical (y-axis) direction according to a wavelength change of the laser beam emitted from the variable-wavelength laser 1. Concerning the laser beam emitted from the second light-intensity-distribution converting unit 32, because the emitted laser beam is close to a plane wave, the laser beam is propagated to the spherical-wave converting unit 4 while maintaining the light intensity distribution without changing an emission angle.

Referring back to FIG. 1, the spherical-wave converting unit 4 is configured by a convex lens. The spherical-wave converting unit 4 converts an incident plane-wave laser beam into a spherical-wave laser beam. Because a light intensity distribution is spatially changed by the light-intensity-distribution converting unit 3, a light intensity distribution of the plane-wave laser beam made incident on the spherical-wave converting unit 4 is changed. Because light made incident in parallel travels straight to pass a focal point on an emission side, the spherical-wave converting unit 4 is capable of converting the incident plane-wave laser beam into an emission angle conforming to the light intensity distribution change of the incident plane-wave laser beam. Because the light intensity distribution of the plane-wave laser beam made incident on the spherical-wave converting unit 4 is changed in two-dimensional directions in the light-intensity-distribution converting unit 3, the beam scanning device 5 is capable of scanning the laser beam after passage through the spherical-wave converting unit 4 in the two-dimensional directions.

Note that, in FIG. 1, when the distance from the beam scanning device 5 to the position of the receiving device 6 is extremely short, a laser beam can also be used at a distance equal to or smaller than the focal length of the convex lens of the spherical-wave converting unit 4. However, light after imaging beyond the focal length can also be bused. In this case, attenuation is large because the laser beam emitted from the spherical-wave converting unit 4 is a spherical wave. Because the laser beam deviates from the center position of the convex lens, aberration due to the convex lens easily occurs. Therefore, it is desirable to use the vicinity of a convex lens center axis.

Figure 8:
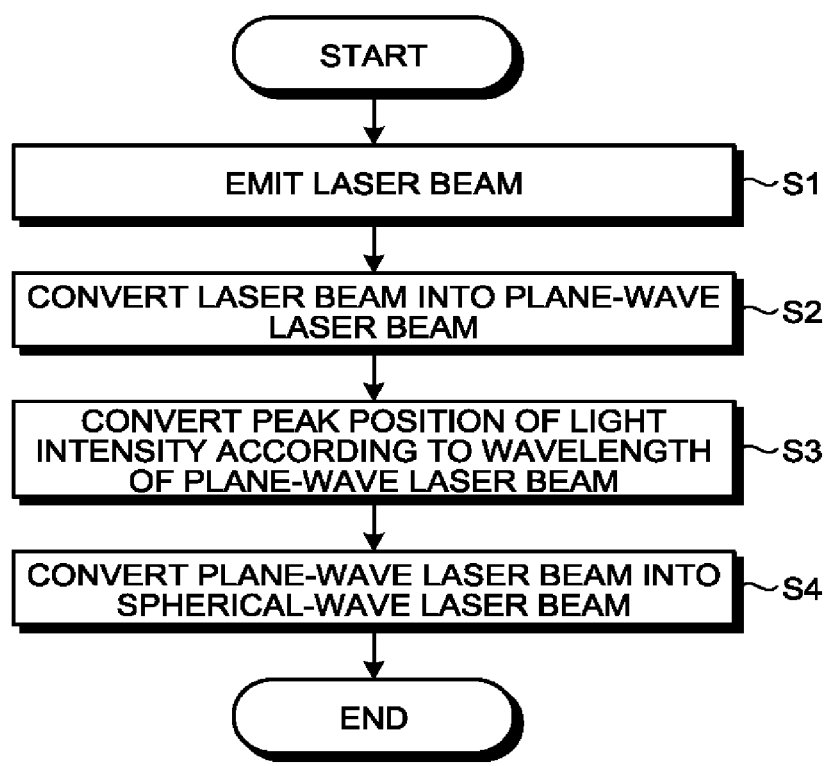
FIG. 8 is a flowchart showing an example of a beam scanning method of the beam scanning device according to the first embodiment.

A beam scanning method in the beam scanning device 5 is explained with reference to a flowchart. FIG. 8 is a flowchart showing an example of a beam scanning method of the beam scanning device 5 according to the first embodiment. First, the variable-wavelength laser 1 of the beam scanning device 5 emits a laser beam while changing a wavelength in a range in which scanning of the laser beam can be performed in a specified area (step S1). The plane-wave converting unit 2 converts the laser beam emitted from the variable-wavelength laser 1 into a plane-wave laser beam (step S2). The light-intensity-distribution converting unit 3, which includes the first light-intensity-distribution converting unit 31 set to be obliquely tilted with respect to an emitting direction of the laser beam within a horizontal plane and the second light-intensity-distribution converting unit 32 set to be obliquely tilted with respect to the emitting direction of the laser beam within a plane perpendicular to the horizontal plane and parallel to the emitting direction of the laser beam, converts a peak position of light intensity of the plane-wave laser beam according to a wavelength of the plane-wave laser beam (step S3). The spherical-wave converting unit 4 converts the plane-wave laser beam, the peak position of the light intensity of which is converted, into a spherical-wave laser beam, changes an emission angle according to the peak position of the light intensity, and emits the laser beam (step S4).

As explained above, according to this embodiment, in the beam scanning device 5, the light-intensity-distribution converting unit 3 sets a beam diameter with which adjacent laser beams among a plurality of laser beams serving as plane waves multiply reflected inside the etalon overlap. Consequently, the light-intensity-distribution converting unit 3 converts the laser beam into a unimodal light intensity distribution and spatially changes the light intensity distribution in two-dimensional directions according to a wavelength of the laser beam while suppressing secondary diffracted light. The spherical-wave converting unit 4 converts the laser beam into an emission angle conforming to the light intensity distribution and emits the laser beam. Consequently, the beam scanning device 5 that changes a wavelength of a laser beam to scan the laser beam can achieve action and effects that it is possible to scan a unimodal laser beam in two-dimensional directions without depending on mechanical driving.

In the optical wireless communication system 10 including the beam scanning device 5, the receiving device 6 can receive an optical signal of a unimodal laser beam scanned with secondary diffracted light suppressed. Consequently, the optical wireless communication system 10 can achieve action and effects that noise caused as secondary diffracted light is suppressed and it is possible to perform optical wireless communication excellent in communication quality such as a signal-to-noise ratio.

Note that, in the above explanation in the first embodiment, the two etalons are used in the light-intensity-distribution converting unit 3. However, not only this, but the beam scanning device 5 shown in FIG. 1 can achieve the same action and effects even when the light-intensity-distribution converting unit 3 is configured by one etalon. In this case, the one etalon, which is the light-intensity-distribution converting unit 3, is set to be obliquely tilted with respect to the emitting direction of the laser beam emitted from the variable-wavelength laser 1 (the z direction) within the horizontal plane (the xz plane) and set to be obliquely tilted with respect to the emitting direction of the laser beam emitted from the variable-wavelength laser 1 (the z direction) in the plane (the yz plane) perpendicular to the horizontal plane and parallel to the emitting direction of the laser beam emitted from the variable-wavelength laser 1. Specifically, an angle between the emitting direction of the plane-wave laser beam emitted from the plane-wave converting unit 2 and the normal direction of an incident surface of the one etalon is an angle larger than 0° and smaller than 90°. Consequently, the plane-wave laser beam from the plane-wave converting unit 2 is made incident on the incident surface while being tilted with respect to the normal direction of the incident surface of the one etalon, which is the light-intensity-distribution converting unit 3. According to control of the variable-wavelength laser 1, the plane-wave converting unit 2, or the variable-wavelength laser 1 and the plane-wave converting unit 2, the beam scanning device 5 changes a beam diameter of a laser beam made incident on the light-intensity-distribution converting unit 3 to a beam diameter with which adjacent plane-wave laser beams overlap concerning a plurality of plane-wave laser beams multiply reflected inside the light-intensity-distribution converting unit 3, that is, a beam diameter with which gaps do not occur among a plurality of plane-wave laser beams emitted from the light-intensity-distribution converting unit 3 to the spherical-wave converting unit 4. Consequently, the light-intensity-distribution converting unit 3 can convert the laser beam into a unimodal light intensity distribution and spatially change the light intensity distribution in two-dimensional directions according to a wavelength of the laser beam while suppressing secondary diffracted light. The spherical-wave converting unit 4 converts the laser beam into an emission angle conforming the light intensity distribution and emits the laser beam. Consequently, as in the case in which the two etalons are used in the light-intensity-distribution converting unit 3, the beam scanning device 5 that changes a wavelength of a laser beam to scan the laser beam can achieve action and effects that it is possible to scan a unimodal laser beam in two-dimensional directions without depending on mechanical driving.

Second Embodiment

In the first embodiment, concerning the etalon of the first light-intensity-distribution converting unit 31 and the etalon of the second light-intensity-distribution converting unit 32 of the light-intensity-distribution converting unit 3, a free spectral range (hereinafter referred to as FSR) is not designated. In the following explanation in a second embodiment, the two etalons have different FSRs in the first light-intensity-distribution converting unit 31 and the second light-intensity-distribution converting unit 32 of the light-intensity-distribution converting unit 3.

The configuration of the optical wireless communication system 10 in the second embodiment is the same as the configuration in the first embodiment shown in FIG. 1. The configuration of the light-intensity-distribution converting unit 3 in the second embodiment is the same as the configuration in the first embodiment shown in FIG. 2. In the second embodiment, concerning the etalon of the first light-intensity-distribution converting unit 31 and the etalon of the second light-intensity-distribution converting unit 32, an etalon having periodical wavelength dependency in a transmission characteristic is used. That is, in the second embodiment, an intensity distribution of light transmitted through the etalon of the first light-intensity-distribution converting unit 31 and the etalon of the second light-intensity-distribution converting unit 32 periodically changes according to a wavelength change of a laser beam emitted from the variable-wavelength laser 1. Consequently, the beam scanning device 5 can periodically change a scanning direction of a laser beam emitted from the spherical-wave converting unit 4. A cycle of the change in the scanning direction of the laser beam corresponds to the FSRs of the etalons. The FSRs are uniquely determined according to the size and a refractive index of the etalons.

Figure 9:
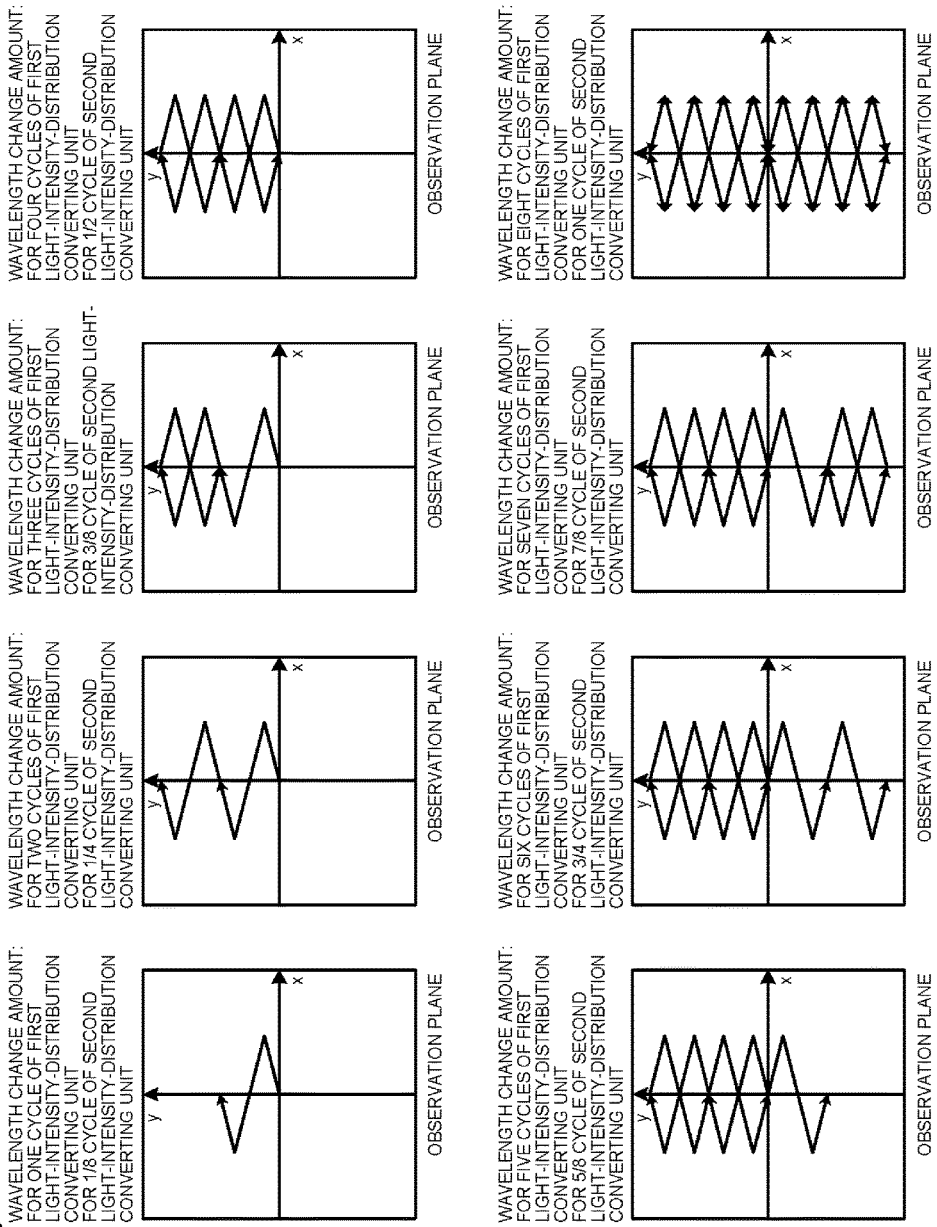
FIG. 9 is a diagram schematically showing a track of beam scanning on an observation plane after transmission through a spherical-wave converting unit in the case in which two etalons in a light-intensity-distribution converting unit have different FSRs in a beam scanning device according to a second embodiment.

FIG. 9 is a diagram schematically showing a track of beam scanning on an observation plane after transmission through the spherical-wave converting unit 4 in the case in which the two etalons in the light-intensity-distribution converting unit 3 have different FSRs in the beam scanning device 5 according to the second embodiment. When the FSR of the etalon of the first light-intensity-distribution converting unit 31 is ⅛ of the FSR of the etalon of the second light-intensity-distribution converting unit 32, a track of beam scanning after transmission through the spherical-wave converting unit 4 including the convex lens parallel to the xy plane can be indicated as shown in FIG. 9. Because a beam scanning cycle in the horizontal direction is ⅛ of a beam scanning cycle in the vertical direction, the beam scanning device 5 performs scanning of a laser beam with a track limited as shown in FIG. 9.

Figure 10:
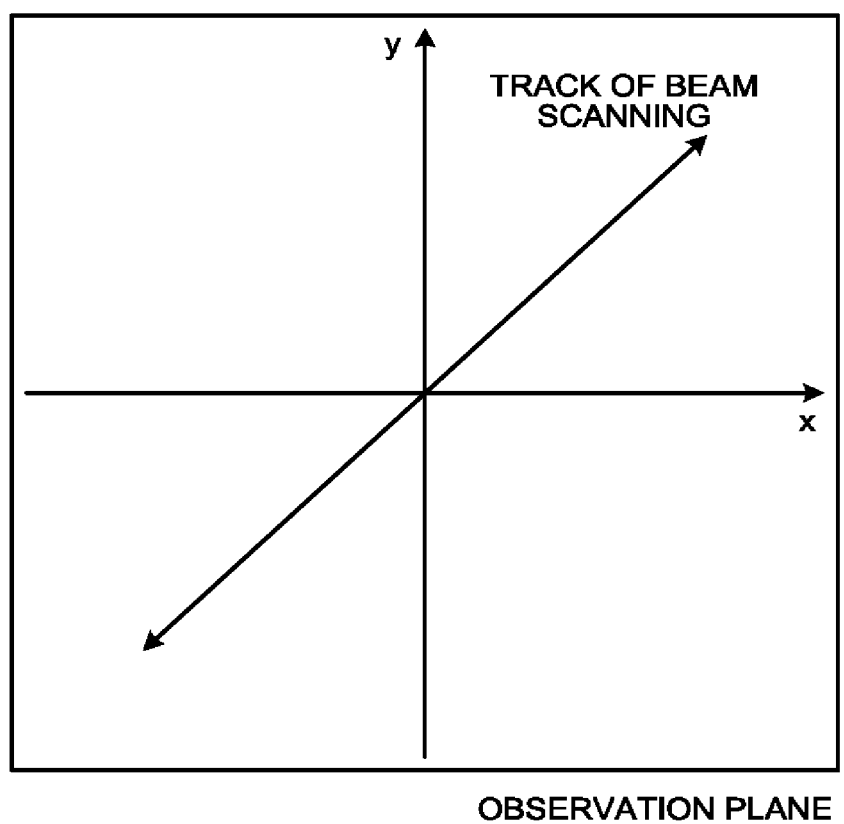
FIG. 10 is a diagram schematically showing a track of beam scanning on the observation plane after transmission through the spherical-wave converting unit in the case in which the two etalons in the light-intensity-distribution converting unit have the same FSR in the beam scanning device according to the second embodiment.

FIG. 10 is a diagram schematically showing a track of beam scanning on the observation plane after transmission through the spherical-wave converting unit 4 in the case in which the two etalons in the light-intensity-distribution converting unit 3 have the same FSR in the beam scanning device 5 according to the second embodiment. When the FSR of the etalon of the first light-intensity-distribution converting unit 31 is the same as the FSR of the etalon of the second light-intensity-distribution converting unit 32, a track of beam scanning after transmission through the spherical-wave converting unit 4 including the convex lens parallel to the xy plane can be indicated as shown in FIG. 10. Because changes in light intensity distributions are the same in the x direction and the y direction, the beam scanning device 5 performs scanning of a laser beam with a track limited as shown in FIG. 10.

It is seen from FIG. 9 and FIG. 10 that, in the beam scanning device 5, when the two etalons in the light-intensity-distribution converting unit 3 respectively have different FSRs, it is possible to expand a scanning range of a beam than when FSRs of the two etalons in the light-intensity-distribution converting unit 3 are the same.

As explained above, according to this embodiment, the beam scanning device 5 can obtain the same effects as the effects in the first embodiment and can achieve action and effects that, by setting different FSRs concerning the two etalons in the light-intensity-distribution converting unit 3, it is possible to further expand a scanning range of a laser beam than when the two etalons in the light-intensity-distribution converting unit 3 have the same FSR.

Third Embodiment

In the following explanation in a third embodiment, a first light-intensity-distribution converting unit and a second light-intensity-distribution converting unit respectively include temperature control elements, which are elements for controlling temperatures of etalons.

Figure 11:
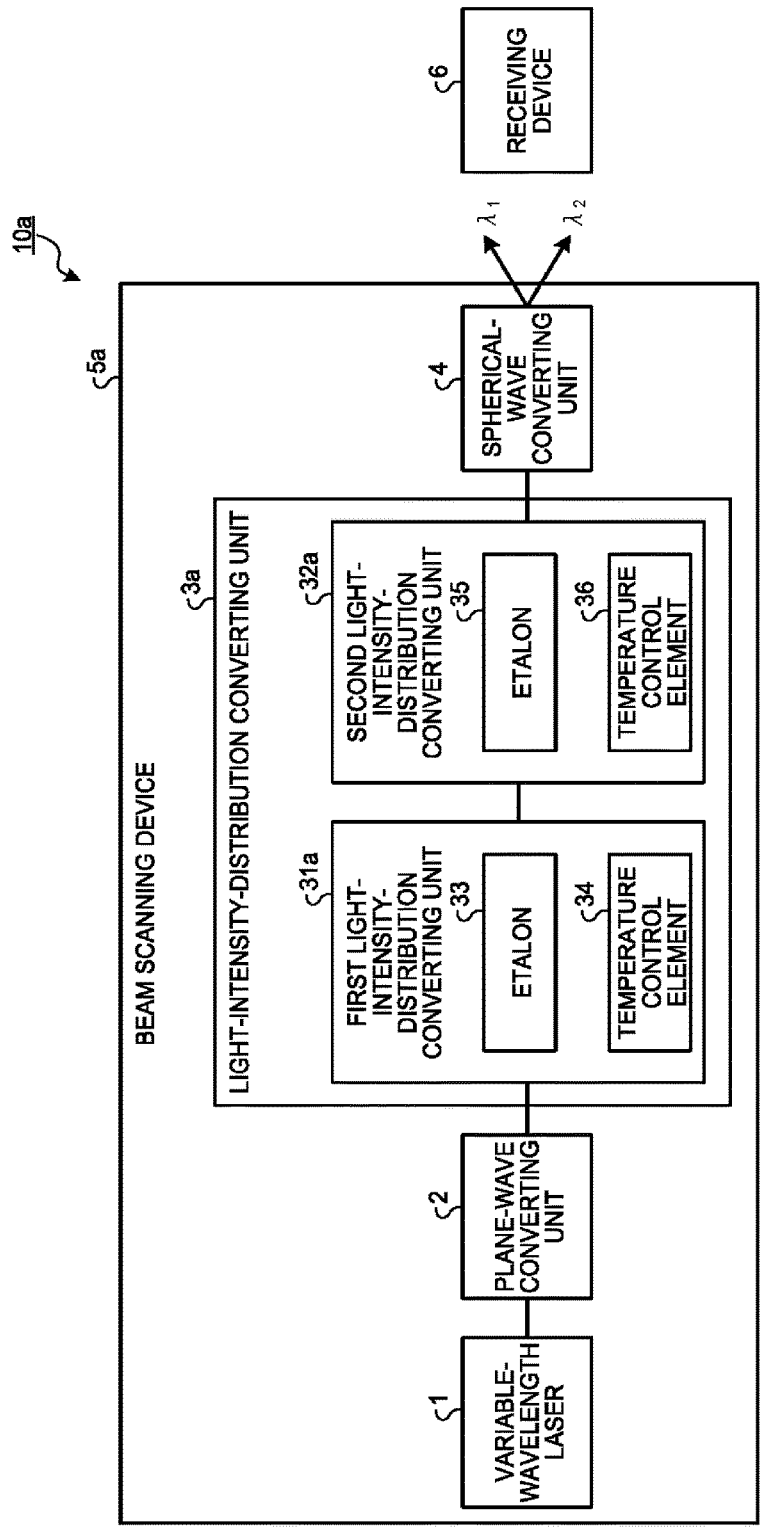
FIG. 11 is a block diagram showing a configuration example of an optical wireless communication system including a beam scanning device according to a third embodiment.

FIG. 11 is a block diagram showing a configuration example of an optical wireless communication system 10a including a beam scanning device 5a according to the third embodiment. The optical wireless communication system 10a includes the beam scanning device 5a and the receiving device 6. The beam scanning device 5a has a configuration in which the light-intensity-distribution converting unit 3 of the beam scanning device 5 shown in FIG. 1 is replaced with the a light-intensity-distribution converting unit 3a. The light-intensity-distribution converting unit 3a includes a first light-intensity-distribution converting unit 31a and a second light-intensity-distribution converting unit 32a. The first light-intensity-distribution converting unit 31a includes an etalon 33 and a temperature control element 34. The second light-intensity-distribution converting unit 32a includes an etalon 35 and a temperature control element 36. The etalons 33 and 35 are etalons having temperature dependency in a transmission characteristic. The temperature control elements 34 and 36 are Peltier elements or elements such as heaters. The temperature control element 34 controls the temperature of the etalon 33. The temperature control element 36 controls the temperature of the etalon 35.

Disposition of the etalon 33 of the first light-intensity-distribution converting unit 31a in the beam scanning device 5a is the same as the disposition in the beam scanning device 5 of the etalon, which is the first light-intensity-distribution converting unit 31, in the first embodiment. Laser beams made incident on and emitted from the etalon 33 are the same as the laser beams shown in FIG. 4. Similarly, disposition of the etalon 35 of the second light-intensity-distribution converting unit 32a in the beam scanning device 5a is the same as the disposition in the beam scanning device 5 of the etalon, which is the second light-intensity-distribution converting unit 32, in the first embodiment. Laser beams made incident on and emitted from the etalon 35 are the same as the laser beams shown in FIG. 6.

Figure 12:
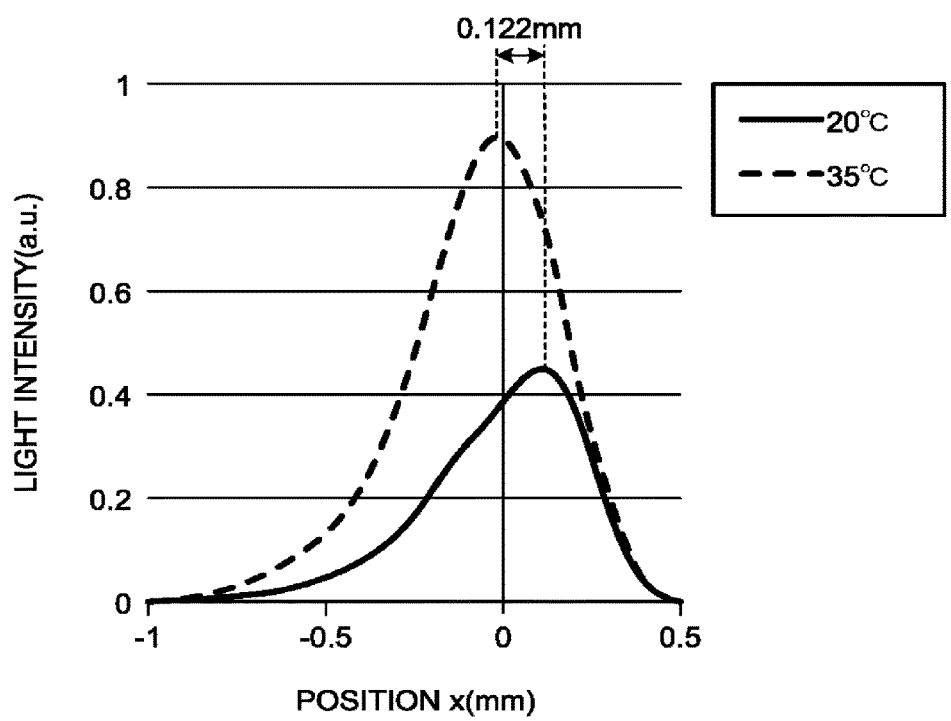
FIG. 12 is a diagram showing a simulation result of a light intensity distribution on an observation plane after transmission through an etalon of a first light-intensity-distribution converting unit parallel to the xy plane in the beam scanning device according to the third embodiment.

FIG. 12 is a diagram showing a simulation result of a light intensity distribution on an observation plane after transmission through the etalon 33 of the first light-intensity-distribution converting unit 31a parallel to the xy plane in the beam scanning device 5a according to the third embodiment. In FIG. 12, the vertical axis represents light intensity (in any unit indicated by a. u.) and the horizontal axis represents a position (in a millimeter unit) in the x-axis direction shown in FIG. 4. Note that an x coordinate of the position of the center of a beam diameter of a laser beam emitted from the variable-wavelength laser 1 is represented as x=0. As shown in FIG. 12, if a wavelength of the laser beam emitted from the variable-wavelength laser 1 is fixed at 1550.53 nanometers, when light intensity at the time when the temperature of the etalon 33 is 20° C. and light intensity at the time when the temperature of the etalon 33 is 35° C. are compared, it is seen that peak positions of the light intensities are different by 0.122 millimeters. In this way, the first light-intensity-distribution converting unit 31a can change a light intensity distribution in the horizontal (x-axis) direction according to a temperature change of the etalon 33 concerning the plane-wave laser beam emitted from the plane-wave converting unit 2.

Figure 13:
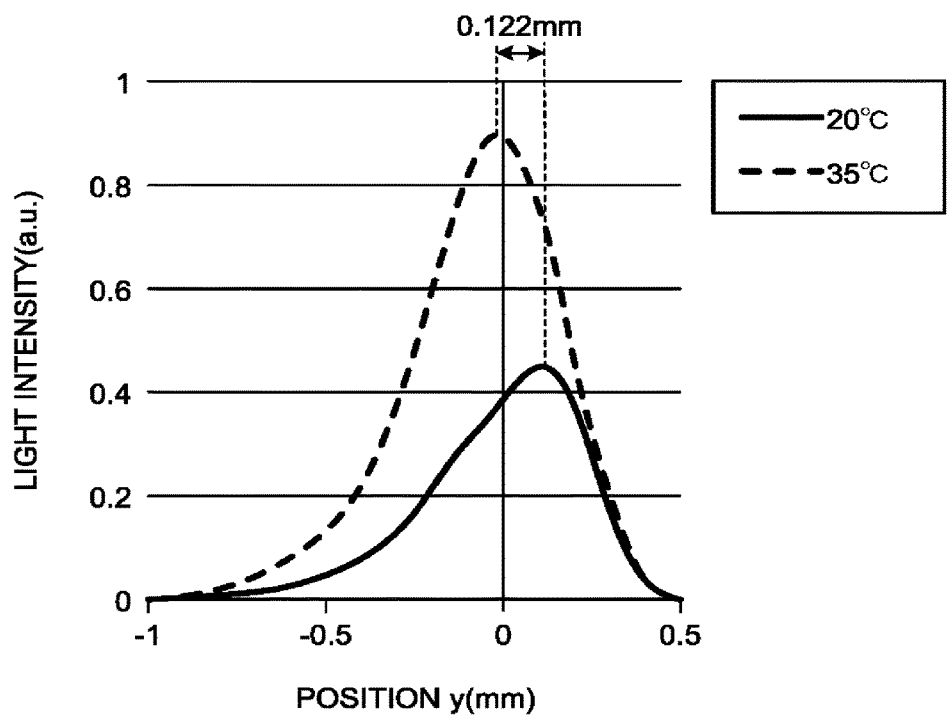
FIG. 13 is a diagram showing a simulation result of a light intensity distribution on the observation plane after transmission through an etalon of a second light-intensity-distribution converting unit parallel to the xy plane in the beam scanning device according to the third embodiment.

FIG. 13 is a diagram showing a simulation result of a light intensity distribution on the observation plane after transmission through the etalon 35 of the second light-intensity-distribution converting unit 32a parallel to the xy plane in the beam scanning device 5a according to the third embodiment. In FIG. 13, the vertical axis represents light intensity (in any unit indicated by a. u.) and the horizontal axis represents a position (in a millimeter unit) in the y-axis direction shown in FIG. 6. Note that a y coordinate of the position of the center of a beam diameter of a laser beam emitted from the variable-wavelength laser 1 is represented as y=0. As shown in FIG. 13, if a wavelength of the laser beam emitted from the variable-wavelength laser 1 is fixed at 1550.53 nanometers, when light intensity at the time when the temperature of the etalon 35 is 20° C. and light intensity at the time when the temperature of the etalon 35 is 35° C. are compared, it is seen that peak positions of the light intensities are different by 0.122 millimeters. In this way, the second light-intensity-distribution converting unit 32a can change a light intensity distribution in the vertical (y-axis) direction according to a temperature change of the etalon 35 concerning the plane-wave laser beam emitted from the first light-intensity-distribution converting unit 31a.

Figure 14:
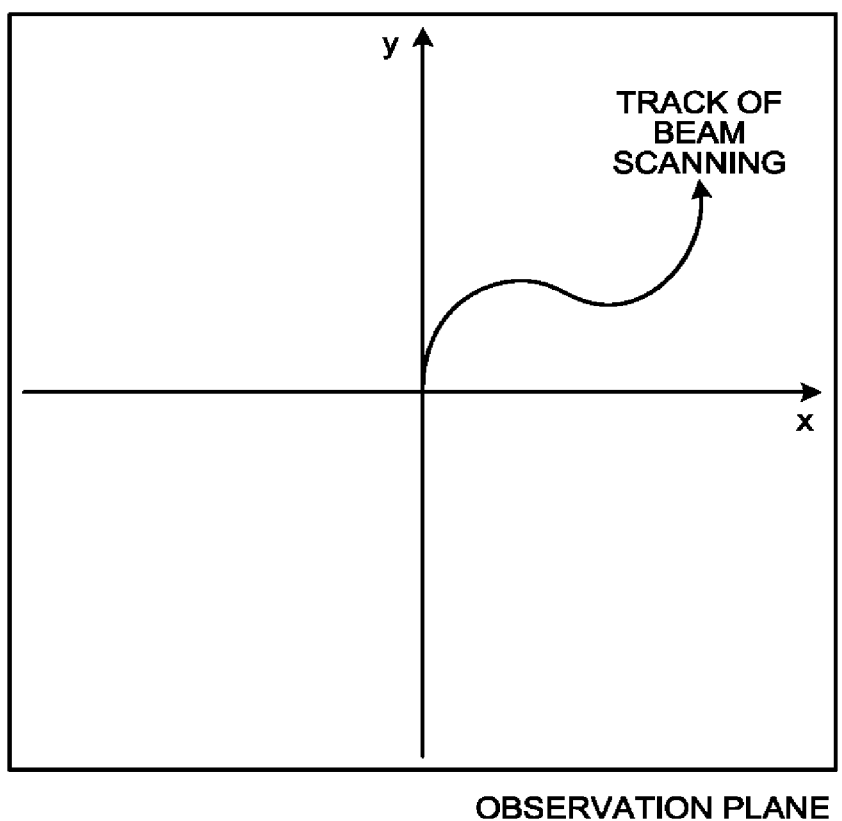
FIG. 14 is a diagram schematically showing an example of a track of beam scanning on the observation plane after transmission through a spherical-wave converting unit in the case in which temperature control of two etalons in a light-intensity-distribution converting unit is performed in the beam scanning device according to the third embodiment.

As explained above, according to this embodiment, the beam scanning device 5a changes the temperatures of the etalons independently in the light-intensity-distribution converting units 31a and 32a. Consequently, the beam scanning device 5a can obtain the same effects as the effects in the first embodiment and can change a light intensity distribution after transmission through the light-intensity-distribution converting unit 3a independently in the horizontal direction and the vertical direction. For example, unlike the first and second embodiments, the beam scanning device 5a can achieve action and effects that it is possible to scan a laser beam in any direction as shown in FIG. 14 after passage through the spherical-wave converting unit 4 parallel to the xy plane. FIG. 14 is a diagram schematically showing an example of a track of beam scanning on the observation plane after transmission through the spherical-wave converting unit 4 in the case in which temperature control of the two etalons in the light-intensity-distribution converting unit 3a is performed in the beam scanning device 5a according to the third embodiment.

Note that, the beam scanning device 5a can change a light intensity distribution of a laser beam transmitted through the light-intensity-distribution converting units 31a and 32a according to temperature control of the light-intensity-distribution converting units 31a and 32a. Therefore, a laser that emits a laser beam first does not have to be a laser capable of changing a wavelength of the laser beam to be emitted.

Fourth Embodiment

In the beam scanning device 5 in the first embodiment, because the Fabry-Perot interference is used, an optical output of a laser beam fluctuates according to an FSR corresponding to a wavelength change. In the following explanation in a fourth embodiment, a beam scanning device performs APC (Automatic Power Control) to enable scanning of a laser beam in a state in which an optical output of the laser beam is fixed.

Figure 15:
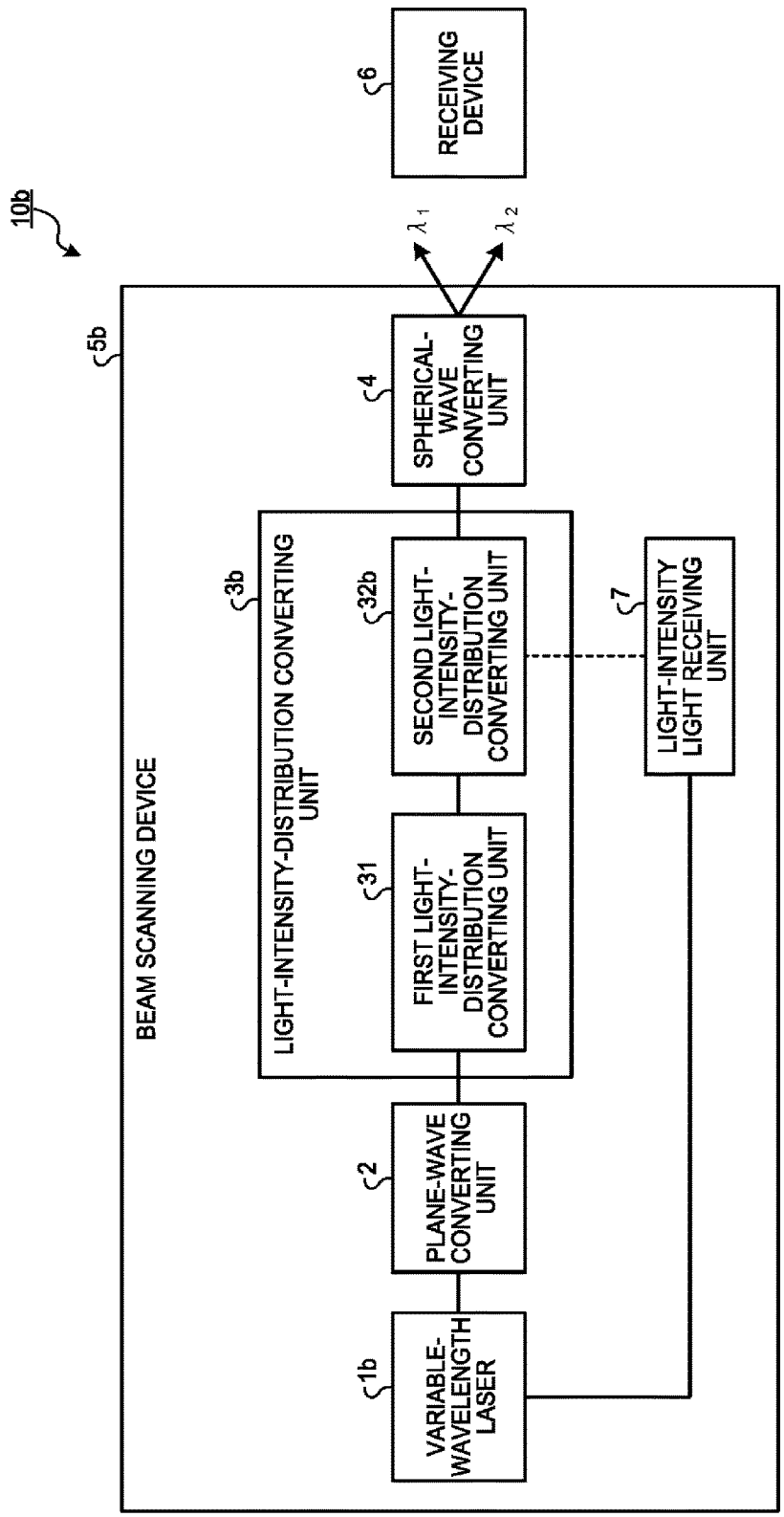
FIG. 15 is a block diagram showing a configuration example of an optical wireless communication system including a beam scanning device according to a fourth embodiment.
Figure 16:
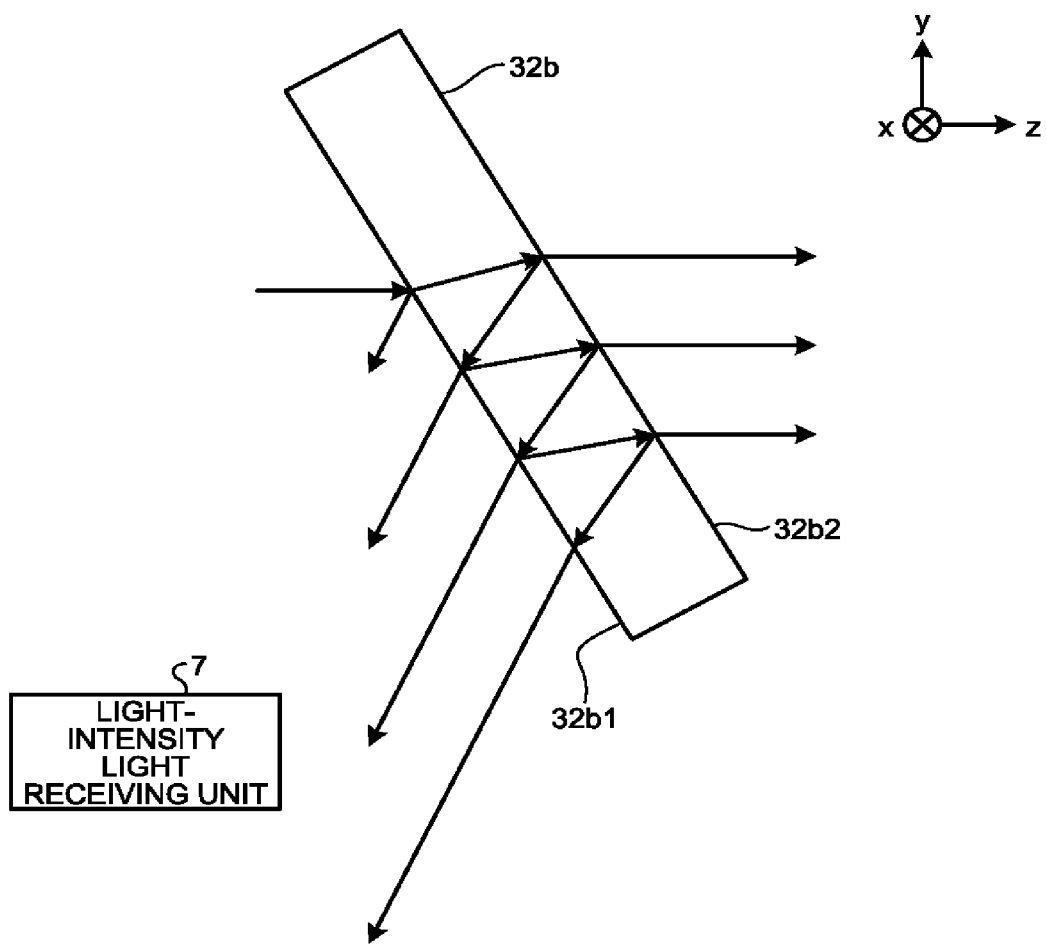
FIG. 16 is a diagram showing an example of a plane-wave laser beam made incident on a second light-intensity-distribution converting unit, a plane-wave laser beam emitted from the second light-intensity-distribution converting unit, and disposition of a light-intensity light receiving unit of the beam scanning device according to the fourth embodiment.

FIG. 15 is a block diagram showing a configuration example of an optical wireless communication system 10b including a beam scanning device 5b according to the fourth embodiment. FIG. 16 is a diagram showing an example of a plane-wave laser beam made incident on a second light-intensity-distribution converting unit 32b, a plane-wave laser beam emitted from the second light-intensity-distribution converting unit 32b, and disposition of a light-intensity light receiving unit 7 of the beam scanning device 5b according to the fourth embodiment. The optical wireless communication system 10b includes the beam scanning device 5b and the receiving device 6. The beam scanning device 5b has a configuration in which the variable-wavelength laser 1 and the light-intensity-distribution converting unit 3 are replaced with a variable-wavelength laser 1b and a light-intensity-distribution converting unit 3b and the light-intensity light receiving unit 7 is added in the beam scanning device 5 shown in FIG. 1.

The light-intensity-distribution converting unit 3b includes the first light-intensity-distribution converting unit 31 and the second light-intensity-distribution converting unit 32b. The second light-intensity-distribution converting unit 32b is configured by an etalon. The etalon of the second light-intensity-distribution converting unit 32b is different from the etalon of the second light-intensity-distribution converting unit 32 in the first embodiment. An AR coat is applied to a part of an incident surface 32b1 of the second light-intensity-distribution converting unit 32 such that a laser beam is made incident on the incident surface 32b1 without reflection. A partial reflection coat is applied to the other part of the incident surface 32b1 such that the laser beam is partially reflected in the inside. Note that disposition of the etalon of the second light-intensity-distribution converting unit 32b is the same as the disposition of the etalon of the second light-intensity-distribution converting unit 32 in the first embodiment.

The light-intensity light receiving unit 7 monitors, on the incident surface 32b1 side of the etalon of the second light-intensity-distribution converting unit 32b, fluctuation in transmitted light intensity on the incident surface 32b1 to obtain information concerning fluctuation in transmitted light intensity on an emission surface 32b2 of the etalon of the second light-intensity-distribution converting unit 32b. The incident surface 32b1 is a second incident surface. The light-intensity light receiving unit 7 controls an electric current fed to the variable-wavelength laser 1b on the basis of the information concerning the fluctuation in the transmitted light intensity on the emission surface 32b2 of the etalon of the second light-intensity-distribution converting unit 32b obtained as a result of the monitoring such that the transmitted light intensity on the emission surface 32b2 of the etalon of the second light-intensity-distribution converting unit 32b is fixed, that is, light intensity of the laser beam emitted from the spherical-wave converting unit 4 is fixed. For example, the light-intensity light receiving unit 7 performs control for reducing an electric current fed to the variable-wavelength laser 1b when the light intensity of the laser beam emitted from the spherical-wave converting unit 4 is larger than the fixed light intensity and increasing the electric current fed to the variable-wavelength laser 1b when the light intensity of the laser beam emitted from the spherical-wave converting unit 4 is smaller than the fixed light intensity. Note that the light-intensity light receiving unit 7 can control the electric current fed to the variable-wavelength laser 1b such that the light intensity of the laser beam emitted from the spherical-wave converting unit 4 is light intensity within a specified range. In the disposition shown in FIG. 16, the light-intensity light receiving unit 7 monitors fluctuation in the transmitted light intensity on the incident surface 32b1 on the incident surface 32b1 side of the etalon of the second light-intensity-distribution converting unit 32b. The light-intensity light receiving unit 7 is configured by, for example, an element that measures light intensity of a laser beam and a processing circuit capable of controlling an electric current fed to the variable-wavelength laser 1b.

According to control of the light-intensity light receiving unit 7, the variable-wavelength laser 1b changes light intensity of a laser beam and emits the laser beam such that the intensity of the laser beam emitted from the spherical-wave converting unit 4 is fixed.

Note that, in the above explanation, the light-intensity light receiving unit 7 controls the variable-wavelength laser 1b. However, not only this, but the light-intensity light receiving unit 7 can notify the variable-wavelength laser 1b of information concerning a result obtained by monitoring fluctuation in transmitted light intensity on the emission surface 32b2 of the etalon of the second light-intensity-distribution converting unit 32b and the variable-wavelength laser 1b can control, on the basis of the result of the monitor by the light-intensity light receiving unit 7 acquired from the light-intensity light receiving unit 7, that is, information concerning the fluctuation in the transmitted light intensity on the emission surface 32b2 of the etalon of the second light-intensity-distribution converting unit 32b, light intensity of a laser beam to be emitted.

As explained above, according to this embodiment, in the beam scanning device 5b, the light-intensity light receiving unit 7 is set on the incident surface 32b1 side of the etalon of the second light-intensity-distribution converting unit 32b to monitor light intensity and perform the APC control. Consequently, the beam scanning device 5b can obtain the same effects as the effects in the first embodiment and emit a laser beam from the spherical-wave converting unit 4 at fixed light intensity and perform scanning of the laser beam.

The configurations explained in the embodiments indicate examples of contents of the present invention. The configurations can be combined with other publicly-known techniques. A part of the configurations can be omitted or changed in a range not departing from the spirit of the present invention.

REFERENCE SIGNS LIST 1, 1b variable-wavelength laser
2 plane-wave converting unit 3, 3a, 3b light-intensity-distribution converting unit
4 spherical-wave converting unit
5, 5a, 5b beam scanning device
6 receiving device
7 light-intensity light receiving unit
10, 10a, 10b optical wireless communication system
31, 31a first light-intensity-distribution converting unit
32, 32a, 32b second light-intensity-distribution converting unit
33, 35 etalon
34, 36 temperature control element
311, 321, 32b1 incident surface
312, 322, 32b2 emission surface.

The invention claimed is:

1. A beam scanning device comprising:
a variable-wavelength laser capable of changing a wavelength and emitting a laser beam;
a plane-wave converter to convert the laser beam into a plane-wave laser beam;
a light-intensity-distribution converter including a first light-intensity-distribution converter set to be obliquely tilted with respect to an emitting direction of the laser beam within a horizontal plane and a second light-intensity-distribution converter set to be obliquely tilted with respect to the emitting direction of the laser beam within a plane perpendicular to the horizontal plane and parallel to the emitting direction of the laser beam, the light-intensity-distribution converter converting a peak position of light intensity of the plane-wave laser beam according to a wavelength of the plane-wave laser beam; and
a spherical-wave converter to convert the plane-wave laser beam, the peak position of the light intensity of which is converted, into a spherical-wave laser beam.

2. The beam scanning device according to claim 1, wherein
the plane-wave laser beam emitted from the plane-wave converter is made incident while tilting with respect to a normal direction of a first incident surface of the first light-intensity-distribution converter, and
the plane-wave laser beam emitted from the first light-intensity-distribution converter is made incident while tilting with respect to a normal direction of a second incident surface of the second light-intensity-distribution converter.

3. The beam scanning device according to claim 1, wherein
the first light-intensity-distribution converter and the second light-intensity-distribution converter are configured by etalons,
a beam diameter of the plane-wave laser beam made incident on the etalon of the first light-intensity-distribution converter is set to a beam diameter with which adjacent plane-wave laser beams overlap concerning a plurality of plane-wave laser beams multiply reflected inside the etalon of the first light-intensity-distribution converter, and
a beam diameter of the plane-wave laser beam made incident on the etalon of the second light-intensity-distribution converter is set to a beam diameter with which adjacent plane-wave laser beams overlap concerning a plurality of plane-wave laser beams multiply reflected inside the etalon of the second light-intensity-distribution converter.

4. The beam scanning device according to claim 1, wherein the first light-intensity-distribution converter and the second light-intensity-distribution converter are configured by etalons, and the etalons have different free spectral ranges.

5. The beam scanning device according to claim 1, wherein each of the first light-intensity-distribution converter and the second light-intensity-distribution converter includes:
an etalon having temperature dependency in a transmission characteristic; and
a temperature controller to control temperature of the etalon.

6. The beam scanning device according to claim 5, wherein the temperature controller is a Peltier element.

7. The beam scanning device according to claim 5, wherein the temperature controller is heater.

8. The beam scanning device according to claim 1, further comprising a light-intensity light receiver to control, on the basis of a result obtained by monitoring transmitted light intensity on a second incident surface of the second light-intensity-distribution converter, an output of the laser beam emitted from the variable-wavelength laser.

9. The beam scanning device according to claim 1, further comprising a light-intensity light receiver to monitor transmitted light intensity on a second incident surface of the second light-intensity-distribution converter, wherein
the variable-wavelength laser controls, on the basis of a result of the monitoring acquired from the light-intensity receiver, an output of the laser beam to be output.

10. A beam scanning device comprising:
a variable-wavelength laser capable of changing a wavelength and emitting a laser beam;
a plane-wave converter to convert the laser beam into a plane-wave laser beam;
a light-intensity-distribution converter set to be obliquely tilted with respect to an emitting direction of the laser beam within a horizontal plane and set to be obliquely tilted with respect to the emitting direction of the laser beam within a plane perpendicular to the horizontal plane and parallel to the emitting direction of the laser beam, the light-intensity-distribution converter converting a peak position of light intensity of the plane-wave laser beam according to a wavelength of the plane-wave laser beam; and
a spherical-wave converter to convert the plane-wave laser beam, the peak position of the light intensity of which is converted, into a spherical-wave laser beam, wherein
the plane-wave laser beam is made incident on an incident surface of the light-intensity-distribution converter while tilting with respect to a normal direction of the incident surface.

11. An optical wireless communication system comprising:
the beam scanning device according to claim 1; and
a receiver to receive an optical signal of a laser beam emitted from the beam scanning device.

12. A beam scanning method comprising:
changing, by a variable-wavelength laser, a wavelength to emit a laser beam;
converting, by a plane-wave converter, the laser beam into a plane-wave laser beam;
converting, by a light-intensity-distribution converter, which includes a first light-intensity-distribution converter set to be obliquely tilted with respect to an emitting direction of the laser beam within a horizontal plane and a second light-intensity-distribution converter set to be obliquely tilted with respect to the emitting direction of the laser beam within a plane perpendicular to the horizontal plane and parallel to the emitting direction of the laser beam, a peak position of light intensity of the plane-wave laser beam according to a wavelength of the plane-wave laser beam; and converting, by a spherical-wave converter, the plane-wave laser beam, the peak position of the light intensity of which is converted, into a spherical-wave laser beam and changing, by the spherical-wave converter, an emission angle according to the peak position of the light intensity to emit the laser beam, wherein the plane-wave laser beam is made incident on an incident surface of the light-intensity-distribution converter while tilting with respect to a normal direction of the incident surface.

13. An optical wireless communication system comprising:

the beam scanning device according to claim 10; and a receiver to receive an optical signal of a laser beam emitted from the beam scanning device.

* * * * *